June 2, 1964   L. W. BARRETT   3,135,845
WEIGHT OPERATED OVERLOAD MOTOR CONTROL FOR VENTILATING SYSTEMS
Filed Jan. 10, 1961   2 Sheets-Sheet 1

INVENTOR.
LEONARD W. BARRETT
BY John H Glaccum
ATTORNEY

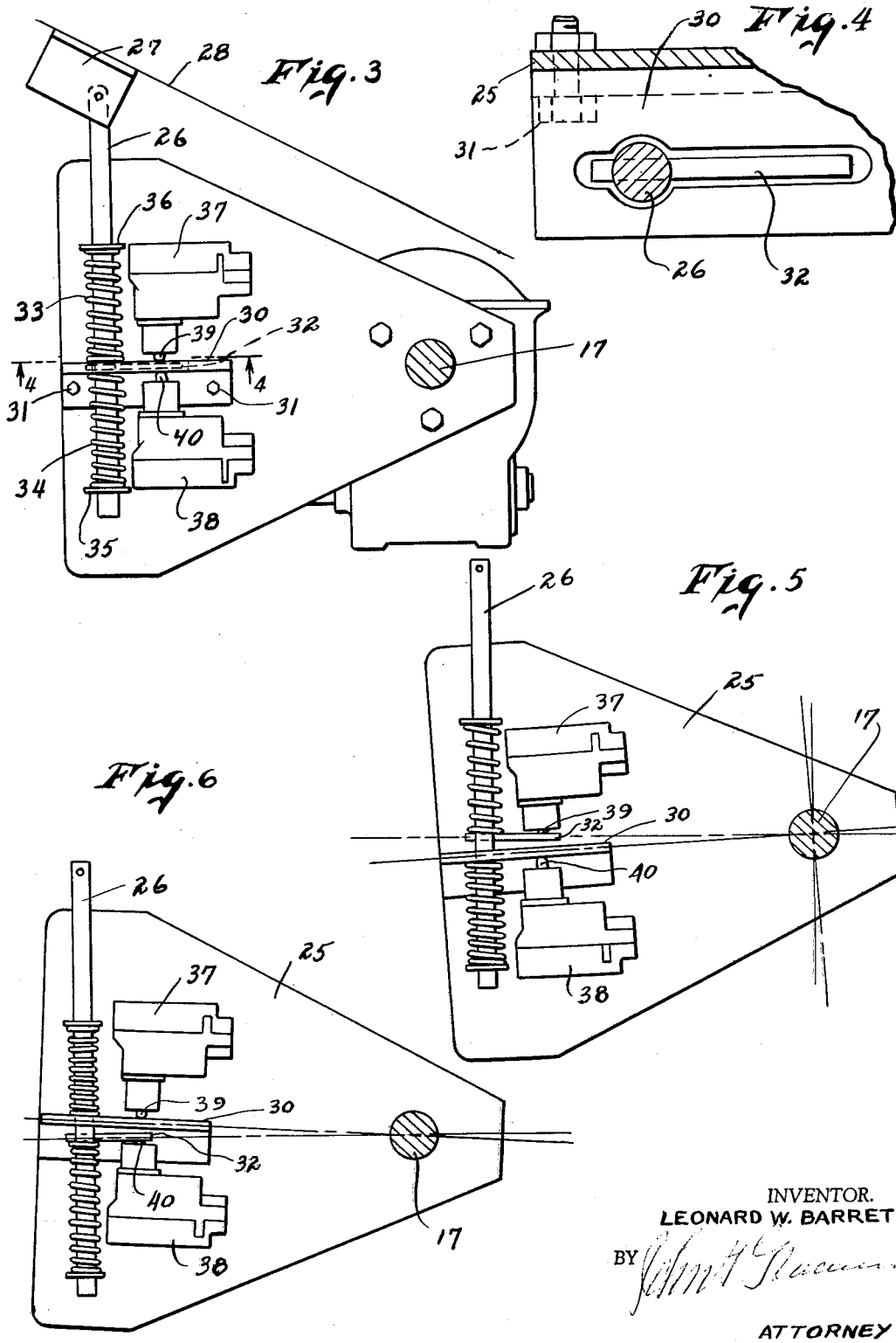

United States Patent Office 3,135,845
Patented June 2, 1964

3,135,845
WEIGHT OPERATED OVERLOAD MOTOR CONTROL FOR VENTILATING SYSTEMS
Leonard W. Barrett, % Burnham Corporation, Lord & Burnham Division, Ossining, N.Y.
Filed Jan. 10, 1961, Ser. No. 81,777
2 Claims. (Cl. 200—85)

This invention relates to overload motor controls and more particularly to the control of motors operating closures or ventilators where undue pressure exerted by the controlling pressure may cause serious damage either in the opening or closing of the ventilator.

This invention is particularly adapted to the control of motors used to open and close greenhouse ventilators. Most of these ventilators are part of the roof structure which consists primarily of glass panels mounted in either wooden or aluminum frames and are subject to a great deal of breakage due to the formation of ice or foreign matter on the closing part of the ventilators. The motors usually are controlled by thermostatic means, and if the temperature in the greenhouse or similar structure falls below a predetermined point, the motor will tend to try to force the closure of the ventilator. If ice or other foreign matter has formed the motor will labor with the result that it will be damaged or a portion of the ventilator fractured. By the same token, if ice has been formed on a closed ventilator and the temperature rises, the motor will endeavor to force the ventilator open even though the ice or foreign matter may prevent such opening.

An object of this invention is therefore to provide a control which will prevent undue strain due to the causes above mentioned but which, at the same time, will exert sufficient pressure to open or close the ventilators when the obstruction is removed, or, in the case of ice, melts.

A further object of the invention is to provide in cooperation with a conventional thermostatic control means to disconnect the motor operating the control when undue pressure is met.

Other objects and advantages of the invention will appear from the accompanying drawings and the following description in which the simplicity of construction, lightness of weight, and economy of construction are major factors.

In the accompanying drawings:

FIG. 3 is a side elevation of one side of the unit showing the position of the control switches.

FIG. 4 is a detailed view taken through the line 4—4 of FIG. 3.

FIG. 5 is a side elevation showing the unit in one position.

FIG. 6 is a view similar to FIG. 5 showing the unit in the opening position.

Figure 1:
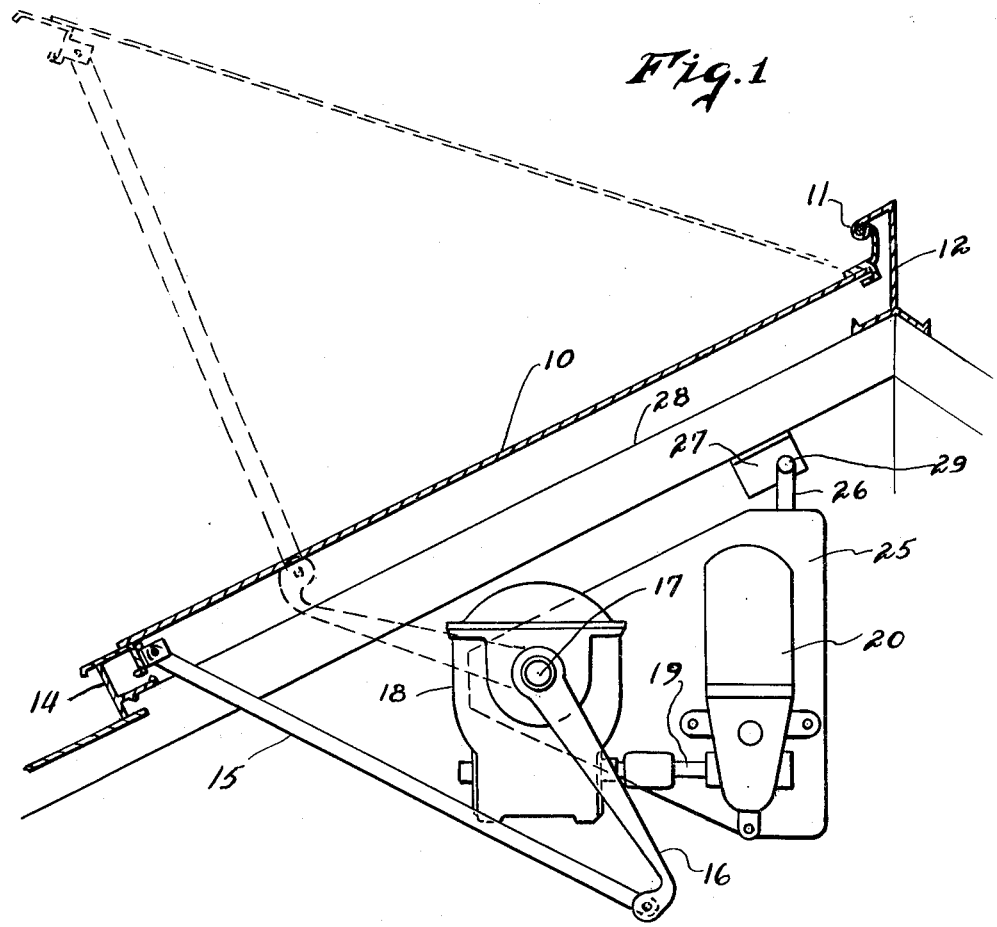
FIG. 1 is a side elevation of a unit controlling a ventilator.
Figure 2:
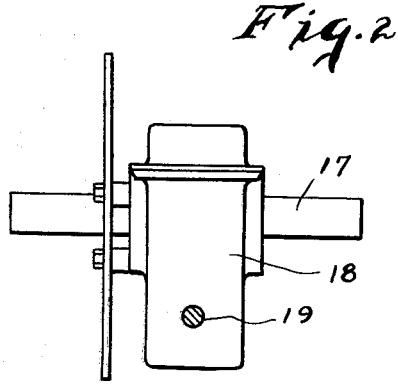
FIG. 2 is a detailed front view of the gear reduction box mounted on its supporting plate.

Referring more particularly to the drawings, I show in FIG. 1 a ventilator 10 hinged at 11 to a roof bar 12 and adapted in the closed position to seal the ventilator 14. The ventilator 10 is provided with an arm 15 engaging a crank arm 16 mounted on the shaft 17 in the gear reduction box 18. The gear reduction box 18 is in turn connected by a shaft 19 to a motor 20. Both units, the gear reduction box 18 and the motor 20, are in turn mounted on a plate 25 which is mounted by a shaft 26 to a flange 27 on the roof bar 28. It will be understood that in actual practice the flange 27 may be a continuous part of the roof bar 28, being I-beam or T-beam in shape. It will also be understood that when the shaft 17 is rotated through action of the motor 20 on the gear reduction box 18, the ventilator will be opened or closed, depending upon the direction of the current. It will also be understood that the motor 20 and the gear reduction box will be mounted on one side of the plate 25.

The plate 25 is supported by the shaft 26 engaging the flange 27 of the roof bar 28 by a pivotal connection 29. On the opposite side of the plate 25 is mounted a flange 30 by means of suitable bolts 31 or other fastenings. The shaft 26 extends through the flange 30 as shown in FIG. 4 and at this point has mounted in it a pin 32. On either side of the flange 30 are a pair of corresponding springs 33 and 34 having stops 35 and 36. The two springs 33 and 34 tend to equalize the position of the shaft 26 midway on the flange 30. Adjacent this mounting are a pair of switches 37 and 38 having contact points 39 and 40. In a normal operation the springs 33 and 34 will maintain the plate in a neutral position so that as contact is brought to the motor 20 the ventilator will be opened or closed depending upon the thermostat (not shown but similar to that shown in Patent No. 2,695,752 issued on November 30, 1954.

However, should ice or other obstruction form on the closure 14 undue pressure would be exerted on the motor 20 through the shaft 17, thus causing the plate 25 to deflect from the neutral position shown in FIG. 3 either upwardly or downwardly, depending upon the direction of the pressure. Thereupon the pin 32 would be deflected to operate the switch contacts 39 or 40 to break the circuit and relieve the motor 20. Upon removal of the obstruction, such as the melting of ice, the springs 33 and 34 would return the plate and pin 32 to the normal position, thus reactivating the motor 20 and causing the opening or closing operation to be completed. However, in the interim just before the removal of the obstruction there would be no additional strain on the ventilator 10, consequently no breakage or damage, but as soon as the obstruction is removed the current would automatically be reconnected and the motor would continue its original purpose.

While I have described the invention as applied to an overload control for ventilators, it will be appreciated that it may be applied to any type of closure such as windows or doors where there is a danger of damage being done due to an over operation of the controlling motor power.

I claim:
1. A motor control for an electrically operated motor mounted on a plate, a shaft pivotally mounted on a fixed support, a pair of spring members on said shaft, a flange on said plate having an opening through which said shaft passes, said flange being positioned between said spring members and normally abutting the ends of said spring members to position said plate on said shaft, a pair of circuit breaking switches on said plate, one on either side of said flange, said circuit breaking switches having contacts, a pin in said shaft extending between said contacts whereby the movement of said plate in either direction will cause said flange to compress one of said spring members and said pin to engage one of said contacts and operate its circuit breaking switch.

2. A motor control for an electrically operated motor mounted on a plate, a shaft pivotally suspended from a fixed support to support said plate, a flange on said plate having an opening through said shaft passes, a pair of spring members on said shaft, one on either side of said flange, one end of each of said spring members normally engaging said flange to position said plate on said shaft, the opposite end of each of said spring members being fixed on said shaft, a pin in said shaft, a pair of limit switches on said plate, one on either side of said pin whereby the movement of said plate in either direction will cause said flange to compress one of said spring members and cause said pin to operate one of said limit switches.

References Cited in the file of this patent
UNITED STATES PATENTS

| | | |
|---|---|---|
| 2,198,488 | Smith | Apr. 23, 1940 |
| 2,481,989 | Eddison | Sept. 13, 1949 |
| 2,600,568 | Nelson | June 17, 1952 |